United States Patent [19]
Brimelow et al.

[11] 4,183,963
[45] Jan. 15, 1980

[54] CONTINUOUS FOOD IMPREGNATION

[75] Inventors: Christopher J. B. Brimelow, Beaconsfield; John E. Brittain, Slough, both of England

[73] Assignee: Societe d'Assistance Technique Pour Produits Nestle S.A., Lausanne, Switzerland

[21] Appl. No.: 939,893

[22] Filed: Sep. 6, 1978

Related U.S. Application Data

[63] Continuation-in-part of Ser. No. 762,650, Jan. 26, 1977, abandoned.

[30] Foreign Application Priority Data

Feb. 2, 1976 [GB] United Kingdom ............... 4004/76

[51] Int. Cl.$^2$ .......................... A23B 4/00; A23B 5/00; A23B 7/08; A23B 7/14
[52] U.S. Cl. .................................. 426/321; 426/331; 426/332; 426/639
[58] Field of Search ............... 426/615, 639, 103, 506, 426/321, 331, 333, 332

[56] References Cited

U.S. PATENT DOCUMENTS

| | | | |
|---|---|---|---|
| 1,696,399 | 12/1928 | Hansen | 426/639 |
| 2,785,071 | 3/1957 | Mathews | 426/639 |
| 3,984,580 | 10/1976 | Gur-Arieh | 426/639 |

*Primary Examiner*—Jeanette M. Hunter
*Attorney, Agent, or Firm*—Watson, Leavenworth, Kelton & Taggart

[57] ABSTRACT

A continuous method of impregnating food material such as vegetables, fruit, meat, eggs, and fish wherein pieces of the food material are immersed in a concentrated solution, such as brine, syrup, meat curing solutions, humectant solutions and mixtures thereof, said pieces being initially buoyant in said solution and being passed together with said solution along a flow path to a separation zone wherein the impregnating solution flows downwards at a rate greater than the rate of flow of the food material whereby those pieces of food material which, by absorption of the desired quantity of impregnant, have lost sufficient of their buoyancy in the surrounding impregnating solution to be carried downwards by the said solution, are continuously separated from pieces of food material which have absorbed less than the desired quantity of impregnant.

23 Claims, 1 Drawing Figure

CONTINUOUS FOOD IMPREGNATION

CROSS REFERENCE TO RELATED APPLICATIONS

This application is a continuation-in-part of application Ser. No. 762,650, filed Jan. 26, 1977 now abandoned, the contents of which are incorporated herein by reference.

DESCRIPTION OF THE PREFERRED EMBODIMENTS

Figure 1:
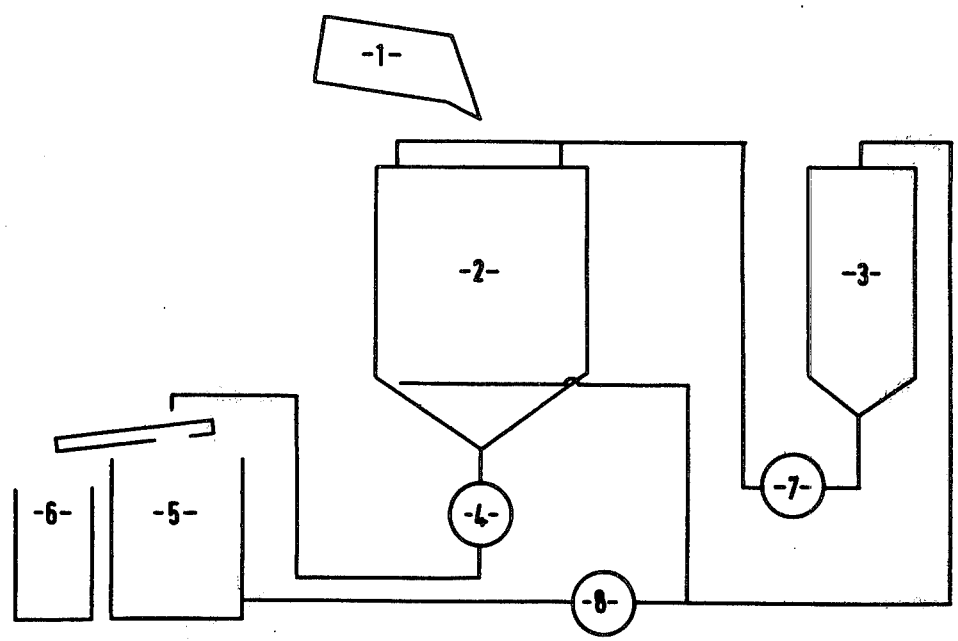

This invention relates to a continuous method for impregnating food, for example, vegetables, fruits, meat, eggs, fish, etc., by any desired impregnant, for example, brine, syrup, meat curing solutions, humectant solutions, mixtures thereof and the like.

Brining, for example, is the impregnation of salt into a food material; it is sometimes also called "curing" or "wet curing". Salt and brine are proven preserving agents for a wide range of food materials. The mechanism of salt preservation is still not fully understood. It is apparent that for many spoilage organisms, the influence of salt is probably due to a drying effect through the osmotic withdrawal of water and thus the microbiological effect of salt reflects the water activity of the food material. When this is the case, sodium chloride can be replaced by equivalent concentrations of other salts and in general their effects may be equated; the term "brine" as used herein includes aqueous solutions of such salts.

Syruping is the impregnation of a sugar or similar material into a food material either as a preservative or as a sweetening or flavouring agent. The most common sugar used is sucrose, but others, such as dextrose or various mixtures of sugars, have also been employed. Sugars exert a preserving effect in essentially the same manner as salt, that is, by limiting the amount of moisture available to the spoilage organisms. One of the important differences between using salt as a preservative and using sugars, is that a much greater concentration of sugar is required to give the same order of preservative action. This makes preservation in sugar generally more expensive than preservation in salt, and sugar is, therefore, only used as a preservative in certain instances where sweet flavour is also important such as in the preservation of fruits, jams, candies, condensed milk and the like. However, syruping may be useful purely for its sweetening or flavouring effect as in the production of fruit such as pears or peaches in syrup.

The conventional method of impregnation followed by storage in impregnation solution may be divided into two groups, single stage methods and two stage methods. In the single stage methods there is no transference of the food material, in other words both the impregnation and the storage are carried out in the same vessel. This vessel is normally either a wooden barrel or cask, or a plastic drum. In the two stage methods, the material is impregnated in one vessel, which may be a barrel or drum or heating pan, or it may be a larger container such as a tank, and storage is carried out in another vessel. These two groups of methods may be further sub-divided into methods where impregnation to the required level is effected using a batchwise system of impregnant changes, and methods where impregnation to the required level is effected by means of a flow of solution.

In the batchwise systems, the material is immersed in a certain volume of static impregnation solution and this solution may or may not be changed during the course of the treatment. Methods involving the use of solid salt or sugar, for example, would also fall into this subgroup. In the solution-flow systems, a flow is maintained over the food material until the material has reached the required level of impregnant.

It is apparent from the above description that none of the present methods of food impregnation is truly continuous, as the food material itself is always treated on a batchwise basis and it remains in a static state in the vessel during attainment of the required level of impregnant. The lack of a suitable continuous process until now has lead to certain problems. In the single and two stage batchwise methods, the rate of uptake of impregnant is slow, especially when large pieces of food material are being treated and when the ambient temperatures are low. The problem of layering also occurs, that is the impregnation solution settles out such that the top layer has a lower content of impregnant than the bottom layer. This means that there is not an even distribution of impregnant throughout the food material in a vessel. Both these problems may be partially overcome by agitating the vessel contents either mechanically or by blowing air through them. Single stage methods also suffer from the fault that full utilisation of available storage is never achieved. Food materials usually lose volume during impregnation, because the volume of water leaving the material is greater than the volume of impregnation solution entering it. This is due to the fact that the cells of the material lose their turgor pressure during uptake of impregnation solution, because of major changes in the cell structure itself. In single stage processes, no advantage is taken of this volume loss by packing extra material into the newly available volume. In two stage methods, though full advantage is taken of storage volume by transferring the food material from the impregnation vessel to the storage vessel, the transference involves certain difficulties in removing all the food material from the former vessel. The transference may require expensive manhandling or mechanical operations.

There are substantial advantages in a fully continuous process over the existing processes. In a continuous process, where the food material as well as the impregnation solution flow through the vessel, the content of impregnant in the food material can be raised to the required level during the process so that material emerging from the vessel at the end of the process is all at the required level. Because the food material flows through the vessel, the transference to the storage vessel or vessels is often a simple operation involving the use of food pumps employing the impregnation solution as a carrier medium.

Furthermore, impregnation is usually particularly rapid as compared with previously used systems.

However, in operating such a continuous flow system it is desirable to ensure that all the individual pieces of food material absorb at least a predetermined minimum quantity of impregnant; similarly, for reasons of economy, it is also desirable that the pieces of food do not absorb unnecessarily large amounts of impregnant. It will be appreciated that if the continuous flow of food material and impregnation solution is merely maintained on the bases of uniform contact time, larger pieces of food may well not have absorbed sufficient impregnant while smaller pieces may have absorbed too much. Similarly, the individual food pieces will often differ in their ability to absorb the impregnant. We have now found that the content of impregnant in the individual pieces of food material can be controlled within suitable limits, often very narrow limits, using simple and inexpensive apparatus, by taking advantage of the increase of specific gravity of the food material as the impregnant is absorbed.

In the process of the present invention, the concentration of impregnation solution is chosen so that the food material will be initially buoyant in the impregnation solution. However, during the impregnation process, individual food pieces absorb impregnation solution and eventually reach the point near the end of the flow path when their buoyancy is nearly equal to that of the surrounding impregnation solution at which point these fully impregnated food pieces can be separated from the more buoyant insufficiently impregnated food pieces by the continuous downflow of impregnation solution. Thus, the specific gravity of the initial impregnation solution is selected to provide a specific gravity, after absorption of impregnant by the food, which is approximately equal to the specific gravity of the pieces of food containing the desired quantity of impregnant. The specific gravity of most foods requiring impregnation, such as fruits, vegetables, meat, fish, or eggs, is close to unity, where the appropriate specific gravities of impregnation solutions are significantly higher, e.g., 1.13 for an 18% w/w salt solution of 1.23 for a 50% sugar solution.

According to the present invention, therefore, we provide a method of continuous impregnation of food material such as, for example, vegetables, fruits, meat, fish, eggs, etc., wherein pieces of the food material to be impregnated are immersed in a concentrated solution of an impregnant, said pieces being initially buoyant in said solution and being passed while immersed in said solution along a flow path to a separation zone wherein the impregnation solution flows downwards at a rate greater than the rate of flow of the food material whereby those pieces of food material which, by absorption of the desired quantity of impregnant, have lost sufficient of their buoyancy in the surrounding impregnation solution to be carried downwards by the said solution, are thereby continuously separated from pieces of food material which have absorbed less than the desired quantity of impregnant.

The procedure may be effected at ambient temperature or, when appropriate, at reduced or elevated temperatures.

The term "fish" as used herein is intended to include within its scope all types of edible sea and fresh water animals such as fish per se, crustacea (for example, crab and lobster meat and shrimps, prawns, etc.), molluscs (for example, mussels, whelks and squid, etc.) and the like.

It will also be appreciated that the term "meat" is intended to include within its scope poultry meat.

In general, the food pieces which may be processed by the method of the present invention should be in the form of a cohesive solid rather than a friable or non-cohesive solid. Thus, it is preferred to use, for example, lightly cooked meat or fish in the present process or hard-boiled whole eggs. If, on the other hand, over-cooked meat or fish or the yolks of hard-boiled eggs are used, there is a danger that the food pieces will break up during the impregnation process. It will be appreciated that the term "food pieces" means discrete masses of food in contrast to pastes or mashes and other semi-solid food materials. The food pieces may be whole natural pieces of food such as eggs or small fish, sections of the natural food source, for example cubes or slices of meat, fish, vegetables or fruit or may be reconstituted vegetable protein such as reconstituted soy protein chunks.

Impregnation solutions which may be used in the method of the present invention are, for example, sugar syrups, brines, meat curing solutions, humectant solutions and the like. Mixtures thereof may also be employed. It should be noted that the same substances, for example sugars, may sometimes be used for different purposes, e.g., as syrups impregnated into fruit or as humectants impregnated into meats, etc. Such solutions are relatively concentrated and have specific gravities significantly higher than unity.

Thus, for example, eggs may be impregnated with brine so that they have a final salt content of about 15%, by using brine of salt strength between about 19 and 22% w/w as the impregnant solution. When treating eggs in this manner they are preferably first hard-boiled and shelled before being subjected to impregnation.

By the method of the present invention it is also possible to impregnate, for example, meat with humectant solution and thus prepare preserved meat without using traditional preservative solutions. The use of humectants for the impregnation of foods is useful for the preparation of so-called "intermediate moisture" food products. Suitable impregnants for the preparation of these intermediate moisture food products are, for example, solutions of substances selected from dextrose, glycerol, sorbitol, salt, fructose, sucrose and mannitol or other suitable polyhydric alcohols; it is frequently advantageous to employ two or more of such substances simultaneously, for example salt and glycerol and/or glucose. Propylene glycol may also be used, but as it has a specific gravity of approximately unity, this should be used in combination with one or more of the above substances.

The above separation is preferably effected in a tower-like vessel. In a preferred embodiment the whole impregnation and separation procedure is effected in a single tower, the food material being introduced at the top of the tower, normally in a diced form as in this form the rate of impregnant uptake is faster than if the food material is in the whole form. Transference of food to the tower top may be achieved by conventional means such as bucket elevation or pumping in water. In the latter case, the food material can be dewatered by means of a sieve or dewatering reel before entering the tower. Impregnation solution of substantially constant concentration, e.g., brine which can normally be produced by a salinator plant, or syrup of constant sugar strength, is then pumped in at the top of the tower through a sprinkler system.

The concentration of impregnant in the impregnation solution depends on the final content required in the food material, but for the purpose of preservation for example, it would normally be in the range 16% up to 26% (saturation) by weight (e.g., 20–26%) for salt or 55%–75%, e.g., 70%–75% by weight for sugar. However, lower concentrations of salt or sugar may be appropriate when impregnation is not intended solely for preservation, e.g., in producing fruit in syrup for preservation by canning or when using salt as a flavourant. It is also possible to use mixtures of impregnants, e.g., a mixture of salt and sugar is useful for impregnation of vegetables for use in chutney and similar preparations.

Other impregnants which may be present include acetic and benzoic acid. Such additions may affect the pH of the solution which is otherwise not critical.

The food material then flows along the impregnation flow-path for the time required to raise the content of the impregnant to the level desired. This time depends on factors such as the specific food material being treated, the concentration of impregnant, the working volume of the tower, the packing factor of the food material and the relative throughput rates of solution and food material. As an example, for carrots diced to 10 mm cubes, with an input brine strength of 18% w/w, in an 0.46 meter diameter by 0.91 meter height tower, with a brine to vegetable flow through ratio of 20:1 by weight, the time required to reach a minimum of 18% w/w salt in the carrot is about $2\frac{1}{2}$ hours. At the end of the required time the food material has progressed to the base of the tower and its specific gravity is very similar to that of the output solution so that it can easily be removed from the tower. Removal from the tower may be aided by agitating the base of the material mass in the tower by mechanical means or, more preferably, by means of jets of spent impregnation solution placed at the base of the tower. Removal may be effected using food pumps, employing the spent solution as a carrier medium. The food material may then be pumped to the storage containers. Impregnated food material may be separated from the impregnation solution and the latter may be reinforced with further impregnant and then reused for impregnation.

As indicated above, the rate of flow of impregnation solution should be greater than that of the food pieces. This ensures that there is comparatively little reduction in the specific gravity of the solution on reaching the separation zone and the flow of solution past the food pieces is necessary to carry the food pieces of low buoyancy downwards from the pieces of higher buoyancy. In general, the ratio of the flow rate of the solution to that of the food pieces is preferably at least 4:1 and more preferably in the range 10:1 to 40:1 e.g., about 20:1. The use of jets of spent solution at the bottom of the tower not only effects the agitation which permits separation of the food pieces, but also increases the flow rate of solution at that point, thereby further assisting separation. In general the ratio of the initial volume of impregnation solution used to impregnate the food pieces to the volume used for agitation may be in the range 10:1 to 1:2.

Where a single tower is used for impregnation and separation, the dead weight of the freshly added food material which is out of the solution for the first few minutes after addition, acts against the buoyancy effect of the food material immersed in the solution and a downward movement through the tower is thus ensured. As the material passes down the tower, it gains impregnant and loses buoyancy. After a certain residence time, the specific gravity of the material has approached that of the output impregnant solution and it is then removed from the tower by the flow of impregnation solution. Any individual pieces of material which, for some reason, have not reached a high enough impregnant level, will tend to float back into the buoyant mass, rather than be removed. The system thus guarantees a predetermined impregnant content in the emerging food material within very narrow limits.

In some cases, particularly when using high impregnant concentrations as in syruping to produce candied fruit, osmotic effects may have an undesirable action on the cellular structure of the food pieces. In such cases, it may be preferable to carry out impregnation in stages, starting with a solution of a concentration which does not produce unwanted osmotic effects, separation of the partially impregnated food pieces as described above and impregnating these by the same procedure with an impregnation solution of higher concentration.

According to a further aspect of the invention we provide apparatus for the continuous impregnation of food comprising a conduit for passing pieces of food material to be impregnated together with impregnation solution along a flow path, said conduit being connected to the inlet of a separating vessel, said separating vessel being provided with an outlet for impregnated food pieces and impregnation solution said outlet being in operation below said inlet, there being provided means for transferring said impregnated food pieces and solution from said outlet being in operation below said inlet, there being provided means for transferring said impregnated food pieces and solution from said outlet to a liquid-solid separation device, means for transferring liquid from said device to means for adding further impregnant to said solution to increase its concentration therein and means for transferring said solution of increased concentration to the inlet of said conduit.

As indicated above, the conduit and separating vessel preferably constitute a single tower, preferably provided with agitation means near the outlet, advantageously jets for injection of impregnation solution as described above.

A schematic diagram of an apparatus for carrying out the continuous process of this invention is shown in the accompanying drawing. Food material falls from the elevator or from the dewatering reel 1 into the tower 3. Impregnation solution is pumped from a producing plant 3 via pump 7 through sprinklers into the tower 2. The material and solution move down the tower 2, the solution moving at a faster rate than the material, until they reach the coniform base of the tower 2. At the base is a mixing system, in this case, a ring of jets around the tower. A pump 4 takes the material and the solution to a separating plant 5. Impregnation solution is pumped from 5 via pump 8, either back to the producing plant 3 to be reinforced or to the mixing jets at the base of the tower. The food is transferred to the storage vessel 6 which may be a barrel or a bulk storage tank.

The following examples are given by way of illustration only:

EXAMPLE 1

The following experiment was carried out in an apparatus similar to the one in the accompanying drawing. 163.3 kg of diced onions (13 mm × 10 mm × 10 mm) were added to the top of an 0.46 meter diameter by 0.91 meter high tower 2 over a period of 405 minutes (0.403 kg/minute) from a vibrator 1. The 163.3 kg of onions were followed by 167.8 kg of diced rutabaga (10 mm × 10 mm × 10 mm) which were added over a period of 345 mins (0.486 kg/minute).

During the same time period of 750 minutes ($12\frac{1}{2}$ hours) brine of salt strength between 23.7% w/w and 25.2% w/w was pumped from a brine plant 3 through a sprinkler system and into the top of the tower at a rate of 9 liters/minute. At the coniform base of the tower, the vegetables were agitated by a series of brine jets and the vegetables and spent brine were then pumped away at about 18 liters/minute, using pump 4, to a sieve system over a tank 5. Brine from 5 was either pumped back to the brine plant 3 or to the jet agitators at the base of the tower. These jets were fed at a rate of about 9 liters/minute. The tower required about 165 minutes to fill and after this time, vegetable emerged from the tower at a rate of 0.318 kg/minute for onion and 0.373 kg/minute for rutabaga. These rates were approximately equal to the input rates if account was taken of the normal vegetable weight losses occurring during brining. The salt content of the finished brined onion varied between 20.5 and 21.8% w/w and that of the finished brine rutabaga varied between 20.0 and 21.8%. The spent brine strength varied between 22.7% w/w and 24.6% w/w.

EXAMPLE 2

Using the apparatus described in Example 1, but with the height of the tower increased to 2.44 meter 352.9 kg of pineapple chunks (13 mm × 19 mm × 25 mm) were added to the top of the tower 2 from a vibrator 1 over a period of 1200 minutes (0.294 kg/min). Over the same period sugar solution of composition 48.6% w/w sucrose and 20.9% glucose syrup (53 DE) and at a temperature of 50° C. was pumped from a syrup production plant 3 through a sprinkler system and into the top of the tower at a rate of 9 liters/minute. The pineapple chunks progressed down the tower to the coniform base where they were agitated by a series of syrup jets feeding at 9 liters/minute from the spent syrup tank 5. The fruit and syrup were then removed from the base of the tower at a rate of 18 liters/minute using pump 4. The fruit and syrup were pumped to a sieve system over a tank 5. The tower required about 660 minutes to fill and after this time the pineapple emerged at a similar rate to the input rate. The soluble sugars content of the finished candied pineapple varied between 46.5% and 47.8% sucrose, and 20.9% and 21.3% glucose expressed as 53 DE syrup. The spent syrup strength varied between 47.6% and 48.2% sucrose and 20.5% and 21.2% glucose (expressed as glucose syrup 53 DE). The fruit pieces were of reasonable appearance, but showed some evidence of collapse. This was thought to be due to the setting up of too great an osmotic pressure gradient when the fruit pieces were first immersed in the 70% dissolved solids sugar syrup.

EXAMPLE 3

Three towers of height 0.91 meter, 1.52 meter, 2.44 meter respectively and all of diameter 0.46 meter were arranged in sequence, the output from the first being transferred via a desyruping reel to the top of the second and the output of the second being transferred via a desyruping reel to the top of the third. Each tower was equipped with its own separate syrup supply plant. The spent syrup from the desyruping reels over the second and third towers was returned to the supply plant or agitation jets belonging to the first and second towers respectively. 362.9 kg of pineapple chunks (13 mm × 19 mm × 25 mm) were added to the top of the first tower over a period of 1215 minutes (0.298 kg/minute) from a vibrator. Over the same time period sugar syrup of composition 25.0% w/w sucrose and 11.4% w/w glucose syrup 53 DE and at a temperature of 50° C. was pumped from the first syrup making plant through a sprinkler system and into the top of the first tower at a rate of 9 liters/minute. The pineapple chunks progressed down the tower to the coniform base where they were agitated by a series of syrup jets fed at 9 liters/minute from the spent syrup supply emerging from the desyruping reel over the second tower. The fruit and syrup were removed from the base of the tower at a rate of 18 liters/minute and were pumped to the desyruping reel over the second tower. The residence time of each fruit piece in the first tower was about 200 minutes and after this time the pineapple emerged at a similar rate to the input rate. The soluble sugars content of the emergent sugared pineapple varied between 24.0% and 24.8% sucrose and 11.1% and 11.8% glucose expressed as 53 DE syrup, while the spent syrup strength varied between 21.2% and 23.1% sucrose and 12.0% and 12.6% glucose expressed as 53 DE syrup.

The partially syruped pineapple pieces emerging from the desyruping reel over the second tower were allowed to fall directly into this tower. Thus, the rate of addition to the second tower was still 0.298 kg/minute. Over the addition period of 1215 minutes, syrup of composition 38.3% w/w sucrose and 17.0% w/w glucose syrup 53 DE and at a temperature of 50° C. was pumped from the second syrup making plant through a sprinkler system and into the top of the tower at a rate of 9 liters/minute. During the period of 330 minutes, the pineapple pieces progressed to the base of the tower. There they were agitated by a series of syrup jets fed at a rate of 9 liters/minute, from the spent syrup supply emerging from the desyruping reel over the third tower. The fruit and syrup were then removed from the base of the second tower at a rate of 18 liters/minute and were pumped to the desyruping reel over the third tower. The rate of emergence of the fruit pieces from the second tower was 0.317 kg/minute, which indicated that there had been a slight gain of weight in this tower. The soluble sugars content of the emergent sugared pineapple varied between 36.1% and 37.8% sucrose and 16.1% and 18.2% glucose as 53 DE syrup, while the spent syrup strength varied between 36.9% and 37.3% sucrose and 16.8% and 18.3% glucose expressed as 53 DE syrup.

The partially syruped pineapple pieces emerging from the desyruping reel over the third tower were allowed to fall directly into this tower, the rate of addition to the third tower was thus 0.317 kg/minute. Over the addition period of 1215 minutes syrup of composition 49.9% w/w sucrose and 21.1% w/w glucose syrup 53 DE and at a temperature of 50° C. was pumped from the third syrup making plant through a sprinkler system and into the top of the tower at a rate of 9 liters/minute. During a period of 560 minutes the pineapple pieces progressed to the base of the tower. There they were agitated by a series of syrup jets fed at a rate of 9 liters/minute from the third spent syrup tank. The fruit and syrup were then removed from the tower at a rate of 18 liters/minute and were pumped to a sieve system over the spent syrup tank. The rate of emergence of the fruit pieces from the third tower was 0.343 kg/minute which indicated that there had been a further gain in weight in the third tower. The soluble sugars content of the emergent candied pineapple varied between 44.2% and 46.3% sucrose, and 27.9% and 21.9% glucose expressed as 53 DE syrup. The spent syrup strength varied between 48.0% and 49.1% sucrose, and 20.9% and 22.1% glucose expressed as 53 DE syrup. The fruit pieces were of good appearance and showed no signs of collapse.

EXAMPLE 4

Using the same apparatus as had been employed for Example 1, 163.3 kg of diced onion (13mm×10mm×10mm) were added to the top of the tower 2 from a vibrator 1 over a period of 345 minutes (0.474 kg/minute).

The onions were followed by 149.7 kg of diced rutabaga (13mm×10mm×10mm), which were added over a period of 365 minutes (0.405 kg/minute). Over the same time period of 710 minutes (11 hours 50 minutes), brine of salt strength between 18.7% and 22.0% w/w during the onion run and between 16.6% and 17.9% w/w during the rutabaga run was pumped from a brine plant 3 through a sprinkler system and into the top of the tower at a rate of 9 liters per minute. After traveling to the coniform base of the tower, the vegetable was agitated by a series of brine jets feeding at 9 liters per minute from the spent brine tank 5. The vegetables and brine were removed from the tower using pump 4 and pumped to a sieve system over a tank 5. The tower required 180 minutes to fill and after this time, vegetables emerged from the tower at a rate of 0.412 kg/minute for the onion and 0.431 kg/minute for the rutabaga. These rates were equal to the input rates if account was taken of the normal vegetable weight losses occurring during brining. The salt content of the finished brined onion varied between 14.4% and 18.6% and that of the finished brined rutabaga between 14.4% and 15.0%. The spent brine strength varied between 17.7% and 21.5% during the onion run and between 15.4% and 16.9% during the rutabaga run. The fluctuations in salt strength of the output brine and vegetable were caused by fluctuations in the input brine strength.

EXAMPLE 5

Using the apparatus described in Example 1, 210 kg of diced carrot (10mm×10mm×10mm) previously brined to a salt content of about 21.5% w/w and then cooked for 7-8 minutes in boiling water to give a salt content of about 8.2% w/w, were added to the top of the tower 2 from a vibrator, over a period of 375 minutes (0.56 kg/minute). During the same time period, a sugar-salt solution mixture containing between 6.6% w/w and 8.3% w/w salt, and between 37.2% w/w and 39.6% w/w sugar was pumped from a syrup making plant 3 into the top of the tower at a rate of 9.5 liters per minute and at a temperature of 76° C. The carrot cubes progressed down the tower to the coniform base. At the base of the tower, the vegetables were agitated by a series of jets of spent sugar-salt solution, feeding at about 9.5 liters/minute from the spent solution tank 5. The vegetables and the sugar-salt solution were then removed from the base of the tower at a rate of 19 liters/minute using pump 4. The carrot cubes and sugar-salt solution were pumped to a sieve system over a tank 5. The tower required 120 minutes to fill and after this time carrot emerged from the tower at a rate of 0.45 kg/minute. This rate was approximately equal to the input rate if account was taken of the normal weight losses occurring during a hot syruping process. The salt content of the finished carrot varied between 6.6% w/w and 7.8% w/w, whilst its sugar content varied between 35.3% and 37.8% sugar. The salt content of the spent solution varied between 6.5% and 8.2% w/w and its sugar content varied between 34.6% and 39.4% w/w.

EXAMPLE 6

325.4 kg of whole hard-boiled and shelled standard eggs were added to the top of an 0.46 meter diameter by 3.64 meter high tower from a vibrator over a period of 1440 minutes (0.226 kg/minute). Over the same time period, brine of salt strength between 19.0% and 21.3% w/w was pumped from a brine production through a sprinkler system into the top of the tower at a rate of 9 liters/minute and at a temperature of 50° C. After traveling to the coniform base of the tower, the eggs were agitated by series of brine jets feeding at 9 liters/minute from a spent brine tank. The eggs and spent brine were removed from the tower using a pump and pumped to a sieve system over the spent brine tank. The tower required 960 minutes to fill and after this time the eggs emerged from the tower at a rate of 0.181 kg/minute which was equivalent to the input rate if account was taken of the normal weight losses occurring during brining. The salt content of the finished brined eggs varied between 14.4% and 15.2% w/w during the run and the spent brine strength varied between 18.2% and 20.5% w/w during the run.

EXAMPLE 7

135.2 kg of deboned and trimmed leg of pork was diced to 12.5 mm cubes and blanched in boiling water for 15 minutes. The resulting 98.4 kg of cooked meat was added to the top of an 0.46 meter diameter by 1.21 meter high tower from a vibrator over a period of 405 minutes (0.243 kg/minute).

Over the same time period a humectant solution of composition 13% w/w glycerol, 9.1% w/w glucose and 10% w/w salt was pumped from a humectant solution production plant through a sprinkler system into the top of the tower at a rate of 9 liters/minute and at a temperature of 50° C. After traveling to the coniform base of the tower, the diced meat was agitated by a series of humectant solution jets feeding at 9 liters/minute from a spent humectant solution tank. The diced meat and spent humectant solution were removed from the tower using a pump and pumped to a sieve system over the spent humectant solution tank. The tower required 165 minutes to fill and after this time the diced meat emerged from the tower at a similar rate to the input rate. The composition of the humectant impregnated meat varied between 5.9% and 6.2% w/w glucose, 8.9% and 9.2% w/w glycerol and between 7.2% and 7.4% w/w salt. The composition of the spent humectant solution varied between 8.5% and 8.9% glucose, 12.1% and 12.8% w/w glycerol and between 9.6% and 9.9% w/w salt. The water activity of the meat sample, as measured by the manometric technique, varied between 0.898 and 0.923.

We claim:

1. A continuous method of impregnating and preserving food material which comprises:
    (a) immersing pieces of food material into a concentrated impregnating solution having a specific gravity greater than that of the food pieces whereby said pieces are buoyant in said solution; and
    (b) passing the solution containing said food pieces along a flow path to a separation zone wherein the impregnating solution flows downward at a rate greater than the flow rate of said pieces until those pieces whose specific gravity, by absorption of the impregnant, substantially equals the specific gravity of the impregnating solution, lose their buoyancy and are carried downward by said solution and are continuously separated from those pieces which have not absorbed enough impregnant to substantially equal the specific gravity of the impregnating solution;

the specific gravity of the impregnating solution being pre-selected so as to impart to the impregnated pieces of food material an amount of impregnant sufficient to preserve said food pieces when their specific gravity is substantially equal to the specific gravity of the initial impregnating solution.

2. A method as claimed in claim 1 in which said separation is effected in a tower into which the food pieces and impregnating solution are introduced at the top while low buoyancy food pieces and impregnating solution are continuously removed from the bottom of the tower.

3. A method as claimed in claim 2 in which the food pieces and impregnating solution are introduced separately into the top of the tower and both impregnation of the food pieces and the separation of food pieces of low buoyancy from those of higher buoyancy is effected in said tower.

4. A method as claimed in claim 3 in which the ratio of the rate of flow of the impregnating solution to the rate of flow of the food pieces is in the range of from 10:1 to 40:1.

5. A method as claimed in claim 2 in which means are provided at or near the bottom of said tower for agitating said food pieces.

6. A method as claimed in claim 5 in which said agitation means include jets of spent impregnating solution.

7. A method as claimed in claim 6 in which the ratio of the volume of impregnating solution introduced at the top of the tower to the volume of impregnating solution used for agitation is in the range of from 10:1 to 1:2.

8. A method as claimed in claim 2 in which impregnated food material together with impregnating solution is removed from the tower by a food pump.

9. A method as claimed in claim 8 in which impregnated food material is separated from impregnating solution and the latter is reinforced with impregnant and reused for impregnation.

10. A method as claimed in claim 1 in which the impregnating solution is brine.

11. A method as claimed in claim 10 in which the concentration of sodium chloride in the impregnating solution is 13% to 26% by weight.

12. A method as claimed in claim 10 in which the concentration of sodium chloride in the impregnating solution is 22% to 26% by weight.

13. A method as claimed in claim 10 in which the food material is a vegetable.

14. A method as claimed in claim 1 in which the impregnating solution is syrup.

15. A method as claimed in claim 14 in which the impregnating solution is sucrose syrup.

16. A method as claimed in claim 14 in which the concentration of impregnant in said syrup is 55% to 75% by weight.

17. A method as claimed in claim 14 in which the food material is fruit.

18. A method as claimed in claim 1 in which the impregnating solution is a solution which comprises at least one of sugar, salt, a meat curing agent and a humectant.

19. A method as claimed in claim 18 in which the humectant is one or more substances selected from the group consisting of dextrose, glycerol, sorbitol, salt, fructose, sucrose and mannitol.

20. A method as claimed in claim 19 wherein the humectant solution comprises a solution of two or more substances selected from the group consisting of dextrose, glycerol, sorbitol, salt, fructose, sucrose, propylene glycol and mannitol.

21. A method as claimed in claim 1 wherein the food material is meat or fish which has been lightly cooked.

22. A method as claimed in claim 1 wherein the food material is whole eggs which have been hard-boiled and shelled.

23. A method as claimed in claim 1 in which the food material is selected from the group consisting of meat, eggs, fish, vegetables, fruit and reconstituted vegetable protein.

* * * * *

UNITED STATES PATENT AND TRADEMARK OFFICE
CERTIFICATE OF CORRECTION

PATENT NO. : 4,183,963
DATED : January 15, 1980
INVENTOR(S) : Christopher J. B. Brimelow and John E. Brittain It is certified that error appears in the above-identified patent and that said Letters Patent are hereby corrected as shown below:

Col. 1, line 52, "method" should read -- methods --.

Col. 3, line 27, "where" should read -- whereas --.

Col. 3, line 29, "of" should read -- or --.

Col. 6, line 34, "tower 3" should read -- tower 2 --.

Signed and Sealed this

Sixth Day of May 1980

[SEAL]

Attest:

SIDNEY A. DIAMOND

*Attesting Officer*  *Commissioner of Patents and Trademarks*